US010481957B2

(12) United States Patent
Wen et al.

(10) Patent No.: US 10,481,957 B2
(45) Date of Patent: Nov. 19, 2019

(54) PROCESSOR AND TASK PROCESSING METHOD THEREFOR, AND STORAGE MEDIUM

(71) Applicant: SANECHIPS TECHNOLOGY CO., LTD., Shenzhen, Guangdong (CN)

(72) Inventors: Bo Wen, Shenzhen (CN); Qingxin Cao, Shenzhen (CN)

(73) Assignee: Sanechips Technology Co., Ltd., Shenzhen, Guangdong Province (CN)

(*) Notice: Subject to any disclaimer, the term of this patent is extended or adjusted under 35 U.S.C. 154(b) by 64 days.

(21) Appl. No.: 15/763,996

(22) PCT Filed: Jul. 1, 2016

(86) PCT No.: PCT/CN2016/088140
§ 371 (c)(1),
(2) Date: Mar. 28, 2018

(87) PCT Pub. No.: WO2017/054541
PCT Pub. Date: Apr. 6, 2017

(65) Prior Publication Data
US 2018/0276051 A1 Sep. 27, 2018

(30) Foreign Application Priority Data
Sep. 28, 2015 (CN) .......................... 2015 1 0626791

(51) Int. Cl.
G06F 9/52 (2006.01)
G06F 9/30 (2018.01)
(Continued)

(52) U.S. Cl.
CPC ............ *G06F 9/52* (2013.01); *G06F 9/30036* (2013.01); *G06F 9/30087* (2013.01);
(Continued)

(58) Field of Classification Search
None
See application file for complete search history.

(56) References Cited

U.S. PATENT DOCUMENTS 5,123,095 A * 6/1992 Papadopoulos ..... G06F 9/30032
708/520
2008/0079713 A1 4/2008 Mejdrich
(Continued)

FOREIGN PATENT DOCUMENTS

CN 101154288 A 4/2008
CN 102200964 A 9/2011
(Continued)

OTHER PUBLICATIONS

English Translation of International Search Report in international application No. PCT/CN2016/088140, dated Sep. 21, 2016, 2 pgs.
(Continued)

Primary Examiner — Eric Coleman
(74) Attorney, Agent, or Firm — Ling Wu; Stephen Yang; Ling and Yang Intellectual Property

(57) ABSTRACT

A processor and a task processing method therefor, and a storage medium. The method comprises: a scalar calculation module executing parameter calculation of a current task, and storing a parameter obtained through calculation in a PBUF; when the parameter calculation of the current task is completed, executing a first instruction or second instruction for inter-core synchronization, and storing the first instruction or the second instruction in the PBUF (301); a vector calculation module reading the parameter from the PBUF, storing the read parameter in a shadow register; when the first instruction or the second instruction is read from the PBUF, storing all the modified parameters in the shadow register in a work register within a period (302); and the vector calculation module executing vector calculation of
(Continued)

the current task according to the parameter in the work register (303).

18 Claims, 11 Drawing Sheets

(51) Int. Cl.
*G06F 9/48* (2006.01)
*G06F 9/38* (2018.01)

(52) U.S. Cl.
CPC ........ *G06F 9/30116* (2013.01); *G06F 9/3824* (2013.01); *G06F 9/3828* (2013.01); *G06F 9/3836* (2013.01); *G06F 9/3889* (2013.01); *G06F 9/4881* (2013.01)

(56) References Cited

U.S. PATENT DOCUMENTS

| | | |
|---|---|---|
| 2008/0082784 A1 | 4/2008 | Mejdrich |
| 2010/0332755 A1 | 12/2010 | Bu |
| 2012/0089824 A1 | 4/2012 | Fukagawa |
| 2014/0006748 A1* | 1/2014 | Stewart ............... G06F 15/7867 712/3 |
| 2014/0115195 A1* | 4/2014 | Higham .................. G06F 13/28 710/22 |
| 2015/0149744 A1* | 5/2015 | Pedersen ............. G06F 15/8053 712/7 |

FOREIGN PATENT DOCUMENTS

| | | |
|---|---|---|
| CN | 102262525 A | 11/2011 |
| CN | 202217276 U | 5/2012 |
| CN | 202534008 U | 11/2012 |
| CN | 105335130 A | 2/2016 |

OTHER PUBLICATIONS

English Translation of the Written Opinion of the International Search Authority in international application No. PCT/CN2016/088140, dated Sep. 21, 2016, 6 pgs.

* cited by examiner

PBUF Data format

| Parameter or synchronization instruction | Operation code | Parameter information or synchronization instruction information |
|---|---|---|
| fork | xxx | xxx |
| synk | xxx | xxx |
| aa | xxx | xxx |
| qq | xxx | xxx |
| ll | xxx | xxx |
| pq | xxx | xxx |
| ... | | |

FIG. 7

| An SCORE executes parameter calculation, and writes a calculation result into a parameter register and a PBUF, and after calculation of a group of parameters for a task is completed, the SCORE executes a fork or sync instruction configured for inter-core synchronization, and writes instruction information into the PBUF | 801 |
|---|---|

| The parameters are read out from the PBUF, parameter values are copied into a shadow register, and when the fork or sync instruction information is read out from the PBUF and a VCORE is in an idle state or executing a sync instruction, all modified shadow register values are copied into a work register at once within one cycle | 802 |
|---|---|

| The VCORE performs vector calculation according to the parameters contained in the work register, and after calculation is completed, executes the sync instruction to update parameters required by a next task, and at the same time when the VCORE performs calculation, the SCORE also calculates parameters of the next task, so as to implement pipeline paralleling of the tasks | 803 |
|---|---|

FIG. 8

PROCESSOR AND TASK PROCESSING METHOD THEREFOR, AND STORAGE MEDIUM

TECHNICAL FIELD

The disclosure relates to a processor technology, and particularly to a processor, a task processing method therefor and a storage medium.

BACKGROUND

In the mobile communication market, there exists the situation that the 2nd-Generation (2G), 3rd-Generation (3G) and 4th-Generation (4G) coexist, and communication technology protocols are also continuously developed. When faced with so many communication standards and rapidly updated protocol versions, it is a good development direction to adopt a Software Defined Radio (SDR) technology to implement baseband signal processing. The SDR technology adopts a Digital Signal Processor (DSP) soft baseband solution, which, compared with a conventional Application Specific Integrated Circuit (ASIC) implementation manner, has higher flexibility and product launching speed. 4G Long Term Evolution (LTE) and subsequent Long Term Evolution-Advanced (LTE-A) technologies all take Orthogonal Frequency Division Multiplexing (OFDM) and Multiple Input Multiple Output (MIMO) as main technical characteristics, and these technical characteristics determine that a processed baseband signal has the characteristic of more matrix operations. Therefore, it is appropriate to adopt a vector DSP processor with a vector operation function to implement LTE and LTE-A baseband signal processing. On such a basis, how to improve performance of a vector processor becomes a key for determining performance of a soft baseband chip.

In the past, performance of a processor is mainly improved by increasing a main frequency of the processor. However, along with increase of a processor frequency, this method is difficult to continue because frequency increase may bring extremely high power consumption and heat cost but may not achieve an obvious processor performance improvement. At present, processors are developed towards a multi-core direction. Multiple processor cores are integrated in a processor, and the multiple processor cores work in parallel to remarkably improve performance of the processor without increasing a frequency of the processor. Widespread use of multi-core desktop processors of the Intel company and multi-core mobile processors of the ARM company shows that a multi-core technology is an effective method for improving performance of a processor. The most common paralleling manner for a multi-core processor is task-level paralleling. As illustrated in FIG. 1, a single-core processor may only execute each task in series, while a multi-core processor may allocate tasks without any dependency to different cores to apparently improve performance. Such a paralleling manner is inapplicable to a task with a dependency on its previous task, that is, input of the task is output of its previous task. For tasks with a dependency, a pipeline paralleling manner may be adopted, that is, different tasks are allocated to different cores for processing separately, and pipeline operations are performed on the tasks.

Specifically to a vector processor, for a certain task, vector operations are not all operations because some parameter calculations are required before the vector operations. These parameter calculations belong to scalar operations, so that a certain task may be divided into two parts, i.e., the scalar operations and the vector operations. If pipeline paralleling may be implemented for the scalar operations and the vector operations, performance of the vector processor may be remarkably improved. At present, multi-core processors mainly adopt a shared memory manner to implement inter-core communication, and if an existing multi-core technology is used to implement paralleling of the scalar operations and the vector operations, parameters are stored in a shared memory, and for reasons of the access speed of the memory and the time overhead for multi-core synchronization, task switching takes a certain time, thereby offsetting part of benefits created by pipeline paralleling.

SUMMARY

Embodiments of the disclosure provide a processor, a task processing method therefor and a storage medium, which solve the problem of high time overhead in task switching of pipeline paralleling of a multi-core processor.

A task processing method for a processor provided by the embodiments of the disclosure may include that:

a scalar calculation module executes parameter calculation for a present task, stores parameters obtained by calculation into a Parameter Buffer (PBUF), when parameter calculation for the present task is completed, executes a first instruction or a second instruction configured for inter-core synchronization and stores the first instruction or the second instruction into the PBUF;

a vector calculation module reads the parameters from the PBUF, stores the read parameters into a shadow register, and when the first instruction or the second instruction is read out from the PBUF, stores all modified parameters in the shadow register into a work register within one cycle;

the vector calculation module executes vector calculation for the present task according to the parameters in the work register.

In the embodiments of the disclosure, the operation that all the modified parameters in the shadow register are stored into the work register within one cycle when the first instruction or the second instruction is read out from the PBUF may include that:

when the first instruction or the second instruction is read out from the PBUF and the vector calculation module is in an idle state or executing a third instruction, all the modified parameters in the shadow register are stored into the work register within one cycle.

In the embodiments of the disclosure, the method may further include that:

after vector calculation for the present task is completed, the vector calculation module executes a third instruction configured for updating parameters of a next task.

In the embodiments of the disclosure, the first instruction executed by the scalar calculation module may be configured to notify the vector calculation module that parameter calculation for the present task is completed; and the first instruction may contain indication information indicating an address of a called subprogram of the vector calculation module.

In the embodiments of the disclosure, the second instruction executed by the scalar calculation module may be configured to notify the vector calculation module that parameter calculation for the present task is completed; and the second instruction may be configured to indicate the vector calculation module to execute programs according to a preset sequence.

In the embodiments of the disclosure, the method may further include that:

after the first instruction or the second instruction is stored into the PBUF, the scalar calculation module calculates parameters of a next task.

A processor provided by the embodiments of the disclosure may include: a scalar calculation module, a vector calculation module and a PBUF, wherein the vector calculation module may include: a shadow register and a work register;

the scalar calculation module may be configured to execute parameter calculation for a present task, store parameters obtained by calculation into the PBUF, when parameter calculation for the present task is completed, execute a first instruction or a second instruction configured for inter-core synchronization, and store the first instruction or the second instruction into the PBUF;

the shadow register may be configured to read the parameters out from the PBUF and store the read parameters;

the work register may be configured to, when the first instruction or the second instruction is read out from the PBUF, store all modified parameters in the shadow register within one cycle; and the vector calculation module may be configured to execute vector calculation for the present task according to the parameters in the work register.

In the embodiments of the disclosure, the work register may further be configured to, when the first instruction or the second instruction is read out from the PBUF and the vector calculation module is in an idle state or executing a third instruction, store all the modified parameters in the shadow register within one cycle.

In the embodiments of the disclosure, the vector calculation module may further be configured to, after vector calculation for the present task is completed, execute a third instruction configured for updating parameters of a next task.

In the embodiments of the disclosure, the first instruction executed by the scalar calculation module may be configured to notify the vector calculation module that parameter calculation for the present task is completed; and the first instruction may contain indication information indicating an address of a called subprogram of the vector calculation module.

In the embodiments of the disclosure, the second instruction executed by the scalar calculation module may be configured to notify the vector calculation module that parameter calculation for the present task is completed; and the second instruction may be configured to indicate the vector calculation module to execute programs according to a preset sequence.

In the embodiments of the disclosure, the scalar calculation module may further be configured to, after the first instruction or the second instruction is stored into the PBUF, calculate parameters of a next task.

The embodiments of the disclosure provide a storage medium, in which a computer program may be stored, the computer program being configured to execute the task processing method for the processor.

In the technical solutions of the embodiments of the disclosure, the scalar calculation module executes parameter calculation for the present task, stores the parameters obtained by calculation into the PBUF, when parameter calculation for the present task is completed, executes the first instruction or second instruction configured for inter-core synchronization and stores the first instruction or the second instruction into the PBUF; the vector calculation module reads the parameters out from the PBUF, stores the read parameters into the shadow register, and when the first instruction or the second instruction is read out from the PBUF, stores all the modified parameters in the shadow register into the work register within one cycle; and the vector calculation module executes vector calculation for the present task according to the parameters in the work register. The processor of the embodiments of the disclosure uses the scalar calculation module and the vector calculation module to execute a scalar processing and vector processing of each task respectively, and utilizes the PBUF as a parameter buffer for outputs of the scalar processing and inputs of the vector processing, so that a scalar processing program and a vector processing program may be executed in parallel, and performance of the processor is remarkably improved. In addition, due to an all-at-once updating strategy from the shadow register to the work register, there is hardly any additional time overhead in task switching of the vector calculation module. The vector calculation module also has a scalar operation function, that is, a Scalar Core (SCORE) is a function subset of a Vector Core (VCORE), and the SCORE and the VCORE adopt a compatible instruction set, so that scalar and vector task division and maximal program optimization may be flexibly implemented. The scalar calculation module is responsible for task control and may flexibly schedule the vector calculation module and control an execution trace of the vector calculation module, thereby facilitating programming.

BRIEF DESCRIPTION OF DRAWINGS

FIG. 7 is a schematic diagram of a data format of a PBUF according to an embodiment of the disclosure.

FIG. 8 is a flowchart of a task processing method for a processor according to embodiment 2 of the disclosure.

DETAILED DESCRIPTION

For making the characteristics and technical contents of the embodiments of the disclosure understood in more detail, implementation of the embodiments of the disclosure will be elaborated below in combination with the drawings. The appended drawings are only adopted for description as references and not intended to limit the embodiments of the disclosure.

For conveniently understanding the technical solutions of the embodiments of the disclosure, in the embodiments of the disclosure, a scalar calculation module is also called as an SCORE, and a vector calculation module is also called as a VCORE. In the embodiments of the disclosure, a first instruction particularly refers to a fork instruction of the SCORE, a second instruction particularly refers to a sync instruction of the SCORE, and a third instruction particularly refers to a sync instruction of the VCORE.

Figure 1:
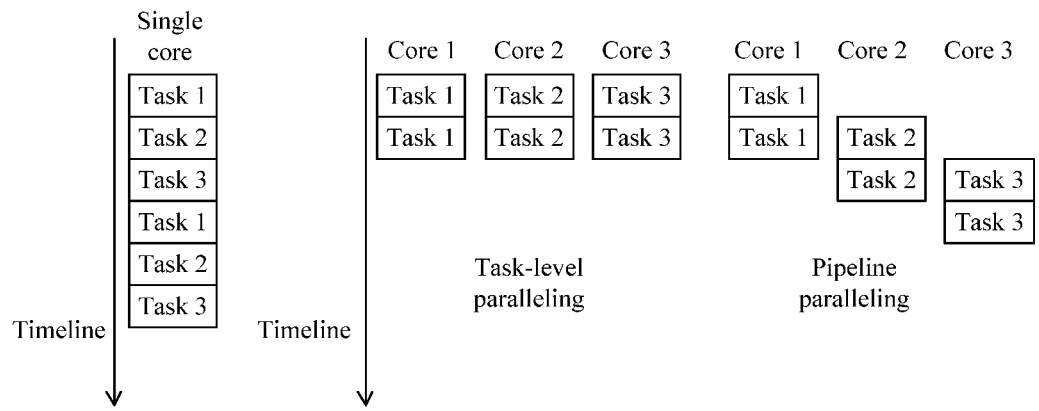
FIG. 1 is a schematic diagram of a multi-core parallel implementation.
Figure 2:
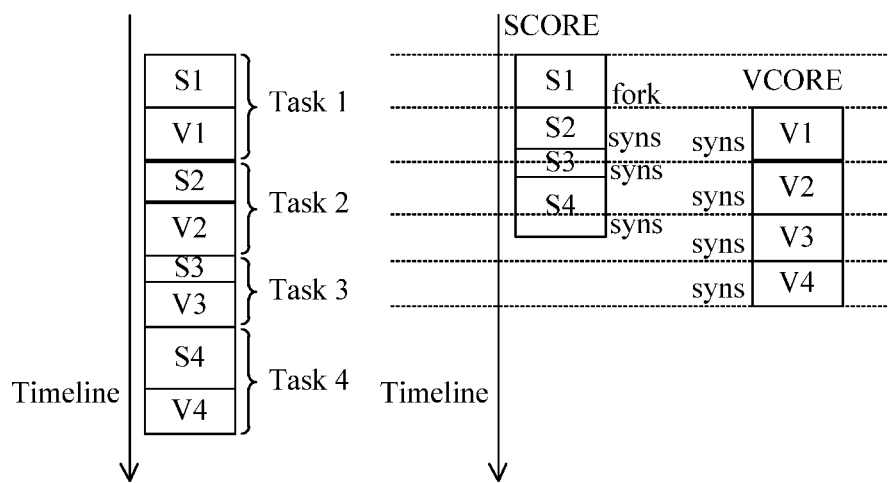
FIG. 2 is a schematic diagram of paralleling and synchronization of a processor according to an embodiment of the disclosure.

FIG. 2 is a schematic diagram of paralleling and synchronization of a processor according to an embodiment of the disclosure. As illustrated in FIG. 2, each task is divided into a scalar processing part and a vector processing part (for example, a task 1 is divided into a scalar processing part S1 and a vector processing part V1). In case of single-core execution, the scalar processing part is required to be executed at first, and then the vector processing part is executed, so that execution efficiency is lower. The scalar processing part and the vector processing part are allocated to an SCORE and a VCORE for processing respectively, and a strict dual-core synchronization mechanism is provided for guaranteeing, so that the scalar processing and vector processing may be implemented at the same time, and a task completion time is significantly shortened. In the figure, the SCORE executes a fork instruction after completing the scalar processing S1, and the fork instruction is to notify the VCORE that parameters have been ready and the VCORE may start executing a vector operation. In addition, the fork instruction further specifies an address of a called subprogram of the VCORE. As long as a PBUF is not completely filled, the SCORE may continue executing scalar processing S2 of a next task and then execute a sync instruction. The sync instruction is also to notify that the VCORE may start executing the vector operation, but it, different from the fork instruction, does not contain the address of the subprogram of the VCORE, which means that the VCORE is required to sequentially execute programs rather than start running from a starting address of a new subprogram. After the VCORE is triggered, the VCORE starts running from the starting address of the subprogram, and then executes a sync instruction after completing the vector processing V1. The sync instruction of the VCORE is to indicate that vector processing of the present task has been completed and parameters of the next task are required to be transmitted for the calculation of the next task. When a parameter calculation completion mark of the next task, i.e., a sync instruction of the SCORE corresponding to S2, is read out from the PBUF, all modified shadow register values are copied into a corresponding work register within one cycle, and then vector processing V2 is started to be executed. Subsequent tasks are also processed according to the above-mentioned manner.

Figure 3:
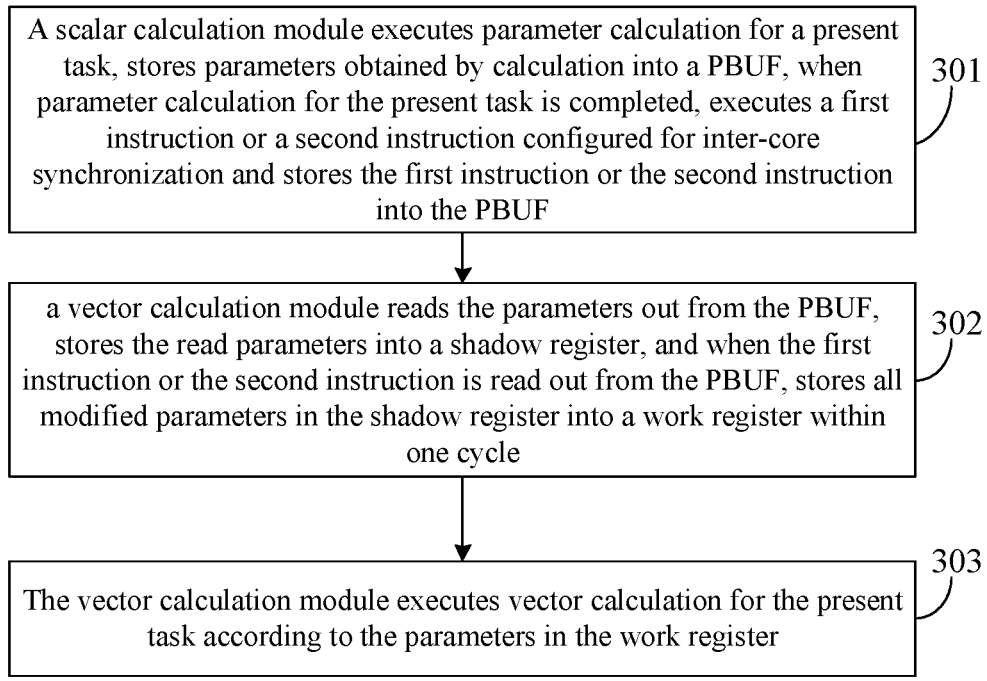
FIG. 3 is a flowchart of a task processing method for a processor according to embodiment 1 of the disclosure.

FIG. 3 is a flowchart of a task processing method for a processor according to embodiment 1 of the disclosure. As illustrated in FIG. 3, the task processing method for the processor includes the following operations.

In 301, a scalar calculation module executes parameter calculation for a present task, stores parameters obtained by calculation into a PBUF, when parameter calculation for the present task is completed, executes a first instruction or a second instruction configured for inter-core synchronization and stores the first instruction or the second instruction into the PBUF.

In the embodiment of the disclosure, the method further includes that:

after the first instruction or the second instruction is stored into the PBUF, the scalar calculation module continues calculating parameters of a next task.

In 302, a vector calculation module reads the parameters out from the PBUF, stores the read parameters into a shadow register, and when the first instruction or the second instruction is read out from the PBUF, stores all modified parameters in the shadow register into a work register within one cycle.

In the embodiment of the disclosure, the operation that all the modified parameters in the shadow register are stored into the work register within one cycle when the first instruction or the second instruction is read out from the PBUF includes that:

when the first instruction or the second instruction is read out from the PBUF and the vector calculation module is in an idle state or executing a third instruction, all the modified parameters in the shadow register are stored into the work register within one cycle.

In the embodiment of the disclosure, the first instruction executed by the scalar calculation module is configured to notify the vector calculation module that parameter calculation for the present task is completed; and the first instruction contains indication information for indicating an address of a called subprogram of the vector calculation module.

In the embodiment of the disclosure, the second instruction executed by the scalar calculation module is configured to notify the vector calculation module that parameter calculation for the present task is completed; and the second instruction is configured to indicate the vector calculation module to execute programs according to a preset sequence.

Here, the preset sequence may be an arrangement sequence of instructions in a program memory.

In 303, the vector calculation module executes vector calculation for the present task according to the parameters in the work register.

In the embodiment of the disclosure, the method further includes that:

after vector calculation for the present task is completed, the vector calculation module executes a third instruction, wherein the third instruction is configured to update parameters of a next task.

Figure 4:
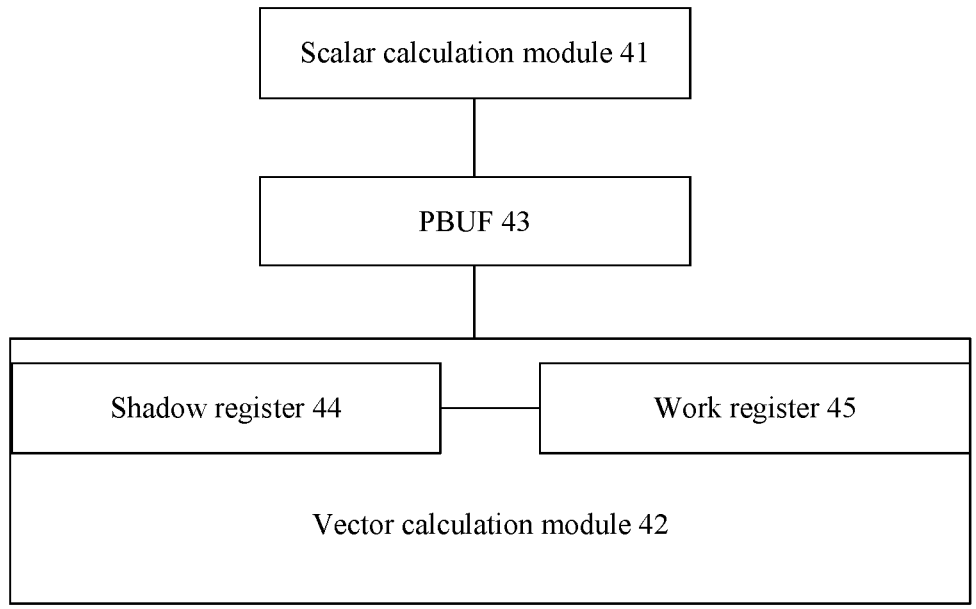
FIG. 4 is a structure diagram of a processor according to an embodiment of the disclosure.

FIG. 4 is a structure diagram of a processor according to an embodiment of the disclosure. As illustrated in FIG. 4, the processor includes: a scalar calculation module 41, a vector calculation module 42 and a PBUF 43, wherein the vector calculation module includes: a shadow register 44 and a work register 45.

The scalar calculation module 41 is configured to execute parameter calculation for a present task, store parameters obtained by calculation into the PBUF 43, when parameter calculation for the present task is completed, execute a first instruction or second instruction configured for inter-core synchronization and store the first instruction or the second instruction into the PBUF 43.

The shadow register 45 is configured to read the parameters out from the PBUF 43 and store the read parameters.

The work register 45 is configured to, when the first instruction or the second instruction is read out from the PBUF 43, store all modified parameters in the shadow register 44 within one cycle.

The vector calculation module 42 is configured to execute vector calculation for the present task according to the parameters in the work register 45.

The work register 45 is further configured to, when the first instruction or the second instruction is read out from the PBUF 43 and the vector calculation module is in an idle state or executing a third instruction, store all the modified parameters in the shadow register 44 within one cycle.

The vector calculation module 42 is further configured to, after vector calculation for the present task is completed, execute a third instruction configured for updating parameters of a next task.

The first instruction executed by the scalar calculation module 41 is configured to notify the vector calculation module that parameter calculation for the present task is completed; and the first instruction contains indication information for indicating an address of a called subprogram of the vector calculation module.

The second instruction executed by the scalar calculation module 41 is configured to notify the vector calculation module that parameter calculation for the present task is completed; and the second instruction is configured to indicate the vector calculation module to execute programs according to a preset sequence.

The scalar calculation module 41 is further configured to, after the first instruction or the second instruction is stored into the PBUF, continue calculating parameters of the next task.

Figure 5:
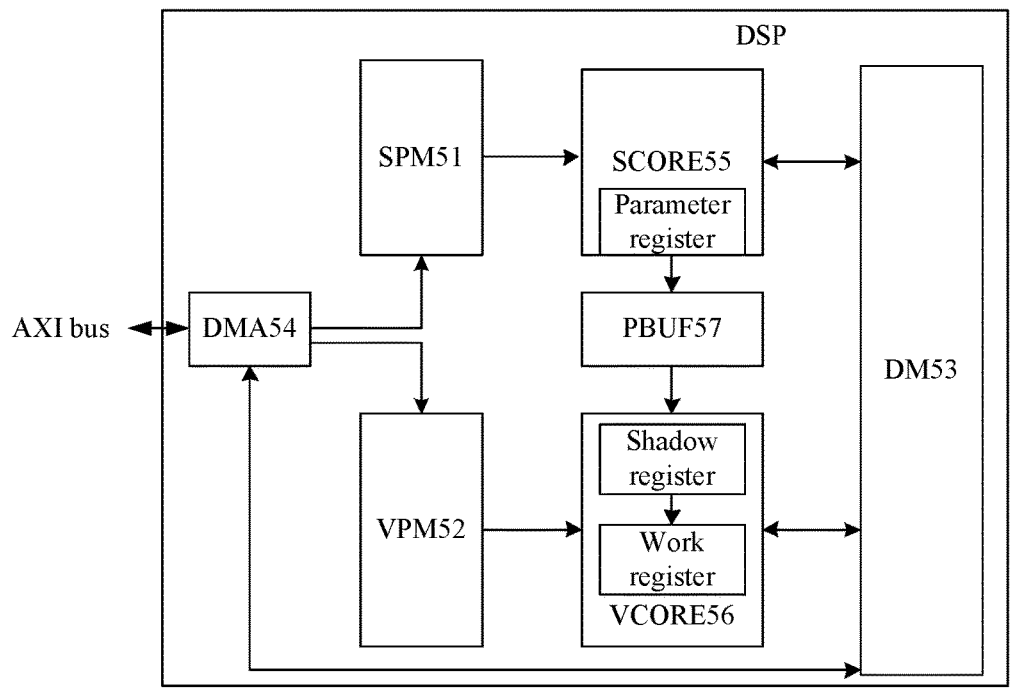
FIG. 5 is a structure block diagram of a processor according to an embodiment of the disclosure.

In combination with functional modules in a practical application, an embodiment of the disclosure further provides a processor, as illustrated in FIG. 5. FIG. 5 is a structure block diagram of a processor according to an embodiment of the disclosure.

The processor of the embodiment of the disclosure includes the following modules: a Scalar Program Memory (SPM) 51, a Vector Program Memory (VPM) 52, a Data Memory (DM) 53 and a Direct Memory Access (DMA) 54.

The processor further includes: an SCORE 55, a VCORE 56 and a PBUF 57, wherein the SCORE 55 contains a parameter register, and the VCORE 56 contains a shadow register and a work register.

In the modules, the SPM 51 and the VPM 52 are program memories of the SCORE and the VCORE, and the SCORE and the VCORE share the DM 53. The DMA 54 is responsible for program and data transportation. The two cores perform inter-core communication through the PBUF 57. Each task program may be divided into a scalar processing part and a vector processing part, wherein the scalar processing part provides parameters for the vector processing part. The SCORE is responsible for the scalar processing part, and the VCORE is responsible for the vector processing part (also with a scalar operation function). The SCORE calculates parameters necessary for vector processing, stores them in the parameter register, and writes the parameters into the PBUF 57. Every time when the SCORE has completed parameter calculation for a task, the SCORE may further execute a fork instruction or a sync instruction (the fork contains an address of a subprogram of the VCORE while the sync does not contain the address) and write the instruction information into the PBUF 57, for a purpose of isolating and distinguishing parameters of different tasks and implementing synchronization of the two cores. The parameters read out from the PBUF 57 are sequentially written into the corresponding shadow register of the VCORE, and when the fork or sync information is read and the VCORE is in an idle state or has completed processing of a last task (marked with execution of a sync instruction by the VCORE), all shadow register values are copied into the corresponding work register at once within one cycle, and then the VCORE starts vector calculation according to the parameters contained in the work register. At the same time when the VCORE performs vector calculation for a certain task, the SCORE may continue parameter calculation for a subsequent task and write parameters into the PBUF 57. Each task is divided into scalar processing and vector processing, which are processed by the SCORE and the VCORE respectively, and the parameters and synchronization information are transmitted by virtue of the PBUF 57, so that parallel operations of the two cores and pipeline operations and rapid switching of continuous tasks may be implemented.

In addition, the processor particularly refers to a DSP and adopts a Harvard structure, and the SCORE and the VCORE share the DM. The DMA 54, which is responsible for program and data transportation, may transport programs from an external storage space into the SPM 51 and VPM 52 in the DSP through an Advanced eXtensible Interface (AXI) bus, and may also perform bidirectional data transportation between the external storage space and the DM. The two cores perform inter-core communication through the PBUF 57. The SCORE is responsible for the scalar processing part, and the VCORE is responsible for the vector processing part (also with the scalar operation function). The SCORE calculates the parameters necessary for vector processing, stores them in the parameter register, and writes the parameters into the PBUF 57. Every time when the SCORE has completed parameter calculation for a task, the SCORE may further execute the fork instruction or the sync instruction (the fork contains the address of the subprogram of the VCORE while the sync does not contain the address) and write the instruction information into the PBUF 57, for the purpose of isolating and distinguishing the parameters of different tasks and implementing synchronization of the two cores. The parameters read out from the PBUF 57 are sequentially written into the corresponding shadow register of the VCORE, and when the fork or sync information is read and the VCORE is in the idle state or has completed processing of the last task (marked with execution of the sync instruction by the VCORE), all the shadow register values are copied into the corresponding work register at once within one cycle, and then the VCORE starts vector calculation according to the parameters contained in the work register. At the same time when the VCORE performs vector calculation for a certain task, the SCORE may continue parameter calculation for a subsequent task and write parameters into the PBUF 57. Each task is divided into scalar processing and vector processing, which are processed by the SCORE and the VCORE respectively, and the parameters and synchronization information are transmitted by virtue of the PBUF 57, so that parallel operations of the two cores and pipeline operations and rapid switching of continuous tasks may be implemented.

Figure 6:
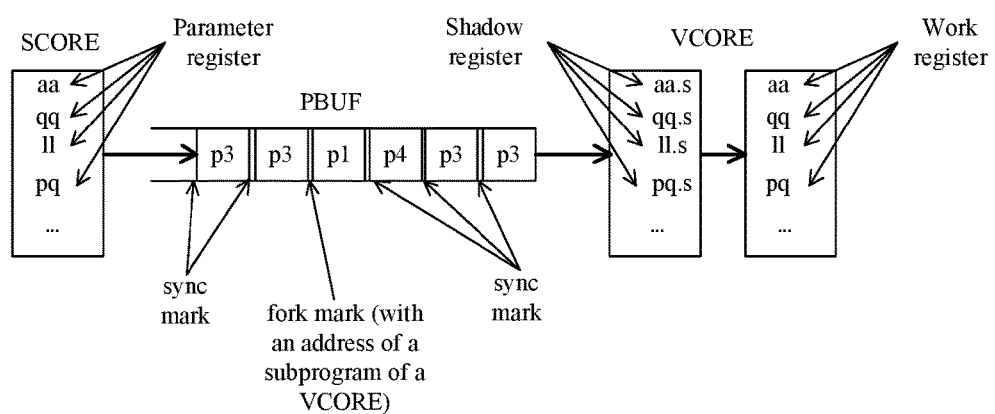
FIG. 6 is a schematic diagram of inter-core communication of two cores according to an embodiment of the disclosure.

FIG. 6 is a schematic diagram of inter-core communication of two cores according to an embodiment of the disclosure. A PBUF is a buffer with a First In First Out (FIFO) structure and stores parameter values and synchronization instruction information sent by an SCORE. In a VCORE, there are some parameter registers, for example, aa, qq, ll and pq, and these parameters may be written into the PBUF. From the PBUF, it can be seen that each group of parameters p1, p2, p2 and the like are isolated by fork or sync marks. The parameters in the PBUF are written into the shadow registers of the VCORE, for example, aa.s, qq.s, ll.s and the like. The shadow registers are named because these registers are updated in background. When the VCORE executes a sync instruction, if the shadow registers corresponding to parameters required by a next task are completely updated (that is, a fork or sync mark of the corresponding task is read), shadow register values are copied into the corresponding work register at once. Thus it can be seen that task switching of the VCORE only consumes one cycle, i.e., a sync instruction execution cycle. Therefore, when a cycle number consumed by a task is larger, a time overhead in task switching may be negligible.

FIG. 7 is a schematic diagram of a data format of a PBUF according to an embodiment of the disclosure. Data in the PBUF includes parameters (aa, qq, ll, pq and the like) and synchronization instructions (fork and sync). Actually, coding processing is performed on the data of the PBUF. When the data is read out from the PBUF, the data is required to be parsed for corresponding processing.

FIG. 8 is a flowchart of a task processing method for a processor according to embodiment 2 of the disclosure. As illustrated in FIG. 8, the task processing method for the processor includes the following operations.

In 801, an SCORE executes parameter calculation, and writes a calculation result into a parameter register and a PBUF. After calculation of a group of parameters for a task is completed, the SCORE executes a fork or sync instruction configured for inter-core synchronization, and writes instruction information into the PBUF.

In 802, the parameters are read out from the PBUF, and parameter values are copied into a shadow register. When the fork or sync instruction information is read out from the PBUF and a VCORE is in an idle state or executing a sync instruction, all modified shadow register values are copied into a work register at once within one cycle.

In 803, the VCORE performs vector calculation according to the parameters contained in the work register, and after calculation is completed, executes the sync instruction to update parameters required by a next task. At the same time when the VCORE performs calculation, the SCORE also calculates parameters of the next task, so as to implement pipeline paralleling of the tasks.

Figure 9:
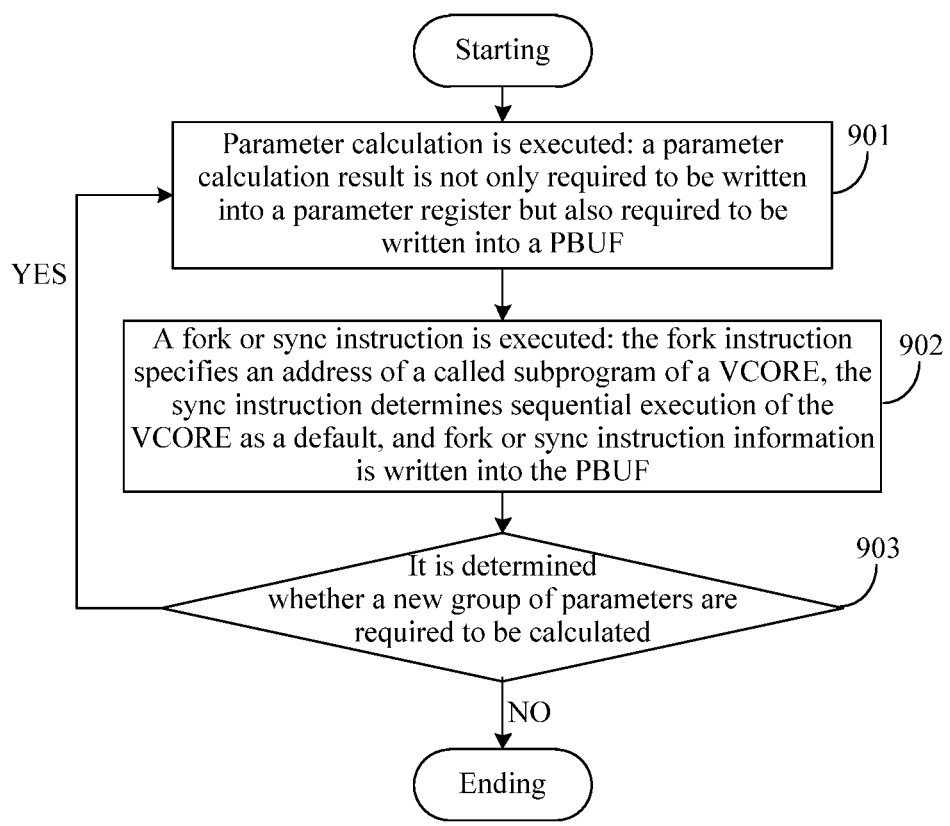
FIG. 9 is a flowchart of task processing of an SCORE according to an embodiment of the disclosure.

FIG. 9 is a flowchart of task processing of an SCORE according to an embodiment of the disclosure. The figure illustrates a task control and scheduling function of the SCORE. As illustrated in FIG. 9, the flow includes the following operations.

In 901, parameter calculation is executed: a parameter calculation result is not only required to be written into a parameter register but also required to be written into a PBUF.

In 902, a fork or sync instruction is executed: the fork instruction specifies an address of a called subprogram of a VCORE and the sync instruction determines sequential execution of the VCORE as a default. Fork or sync instruction information is written into the PBUF.

In 903, it is determined whether a new group of parameters are required to be calculated, if YES, the operation in 901 is re-executed, otherwise the SCORE finishes work.

Figure 10:
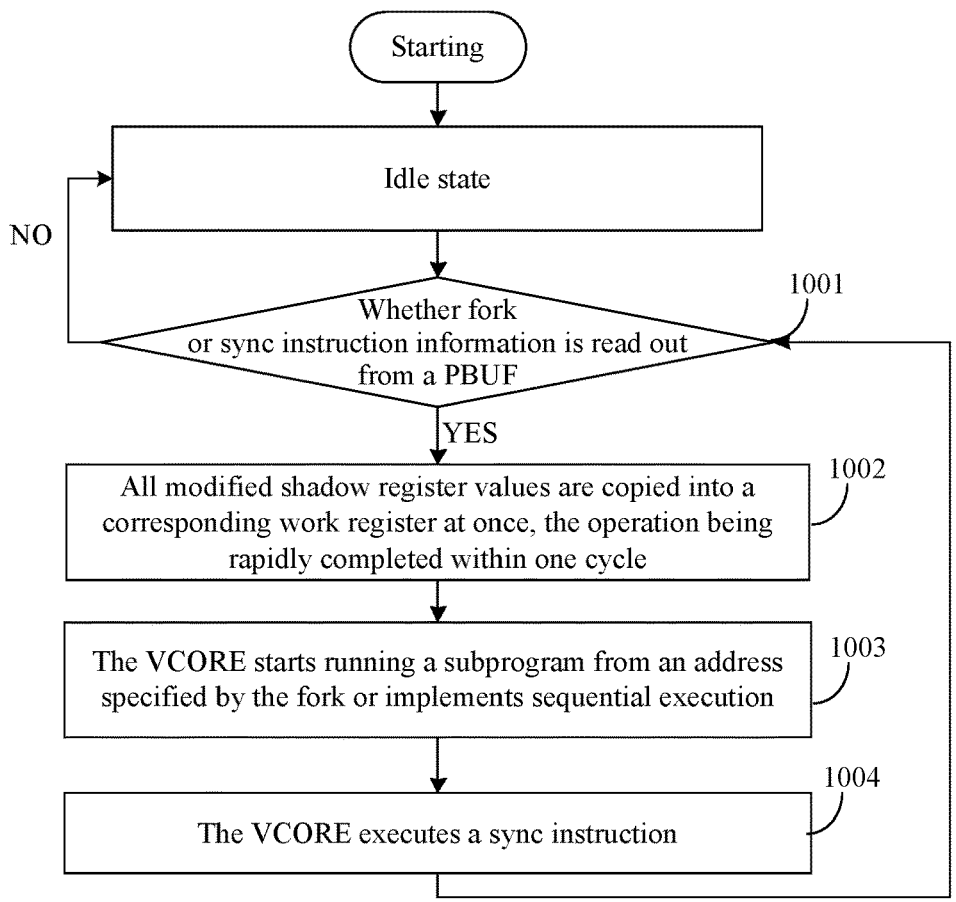
FIG. 10 is a flowchart of task processing of a VCORE according to an embodiment of the disclosure.

FIG. 10 is a flowchart of task processing of a VCORE according to an embodiment of the disclosure. Since the VCORE is a called core, the VCORE is in an idle state at the beginning. As illustrated in FIG. 10, the flow includes the following operations.

In 1001, in the idle state, it is determined whether fork or sync instruction information is read out from a PBUF, if YES, a next operation is executed, and if NO, the idle state is kept.

In 1002, all modified shadow register values are copied into a corresponding work register at once. The operation is rapidly completed within one cycle.

In 1003, the VCORE starts running a subprogram from an address specified by the fork or implements sequential execution.

In 1004, the VCORE executes a sync instruction, and determines whether the fork or sync instruction information is read out from the PBUF. If YES, the VCORE executes the operation of copying the shadow register values into the work register. If NO, the VCORE enters the idle state, and after entering the idle state, keeps waiting for the fork or sync instruction information.

Figure 11:
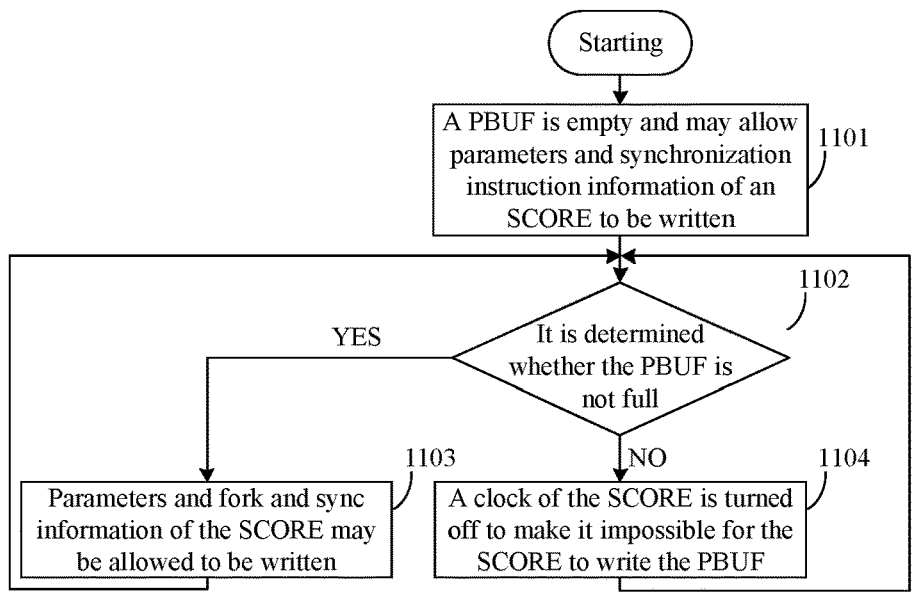
FIG. 11 is a flowchart of a write operation over a PBUF according to an embodiment of the disclosure.

FIG. 11 is a flowchart of a write operation over a PBUF according to an embodiment of the disclosure. As illustrated in FIG. 11, the flow includes the following operations.

In 1101, the PBUF is empty at the beginning, and may allow parameters and synchronization instruction information of an SCORE to be written.

In 1102, it is determined whether the PBUF is not full, if YES, the operation in 1103 is executed, and if NO, the operation in 1104 is executed.

However, if the PBUF is unable to be read for a special reason, the PBUF may be filled by the SCORE. For preventing overflow of the PBUF, a clock of the SCORE is required to be turned off at this moment, thereby stopping running of the SCORE and further making it impossible for the SCORE to continue writing the PBUF.

In 1103, the parameters and fork and sync information of the SCORE may be allowed to be written.

In 1104, the clock of the SCORE is turned off to make it impossible for the SCORE to write the PBUF.

In addition, for a read operation over the PBUF, when the PBUF is empty, the read operation is not executed. When the PBUF is not empty, if a parameter is read, the parameter is written into a corresponding shadow register. When fork or sync instruction information is read out from the PBUF, it is necessary to determine whether the VCORE is in an idle state or executing a sync instruction. If YES, copying of the modified shadow register values to a work register is executed, and if NO, arrival of the sync instruction of the VCORE is kept waited.

Figure 12:
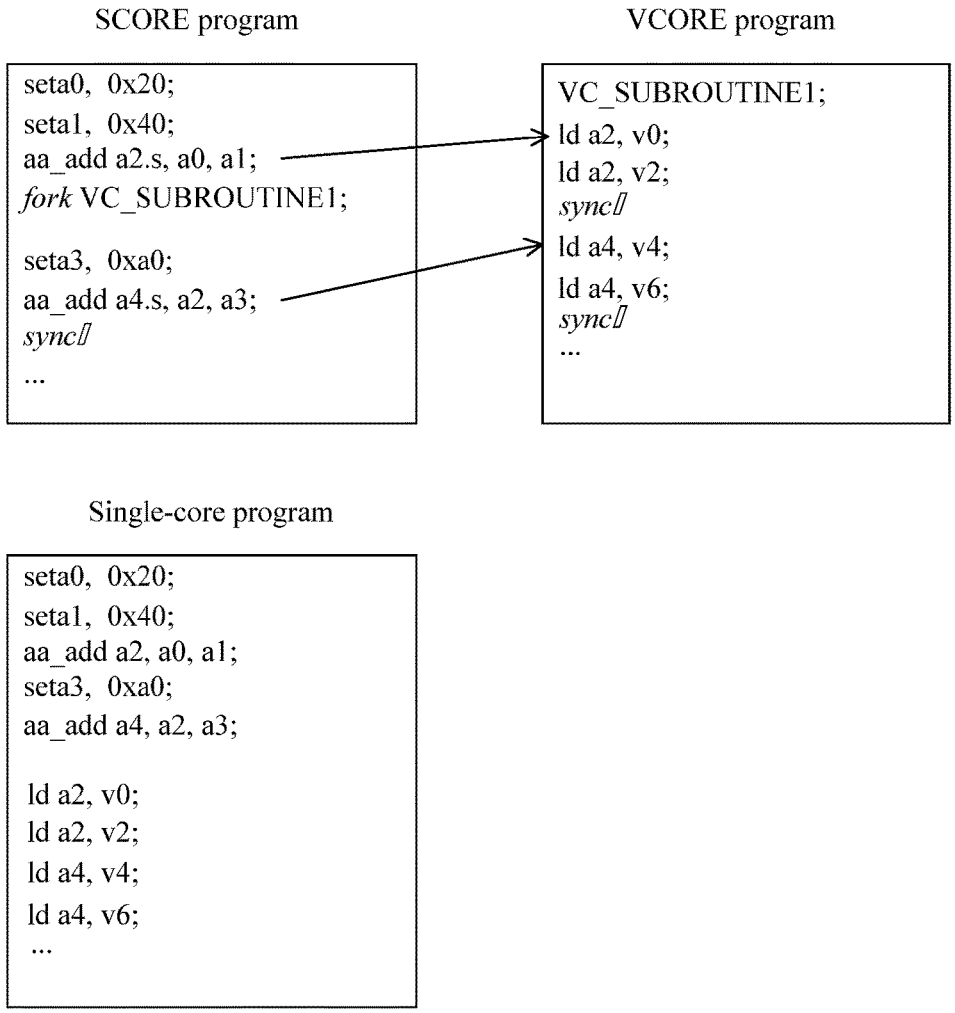
FIG. 12 is a schematic diagram of a simple microcode example of a dual-core DSP and a schematic diagram of a program code corresponding to single-core execution of the same task.

FIG. 12 is a schematic diagram of a simple microcode example of a dual-core DSP. An SCORE provides calculation of an ld (load) instruction address a2 for a VCORE. ".s" in "a2.s" code represents that a result of a parameter register a2 may be transmitted to a shadow register a2.s through a PBUF and further transmitted to a work register a2 of the VCORE. After the calculation of a2 is completed, a fork instruction is used to call a subprogram VC_SUBROUTINE1 of the VCORE. In the subprogram of the VC_SUBROUTINE1 of the VCORE, an ld instruction executes a vector load operation by virtue of a2 calculated by the SCORE and then uses a sync instruction to finish this operation. For a next task, the SCORE provides calculation of an ld (load) instruction address a4 for the VCORE. After the calculation is completed, the SCORE uses a sync instruction. In this case, the sync instruction of the SCORE indicates the VCORE to implement sequential execution, and the VCORE continues executing the operations that the ld instruction executes a vector load operation by virtue of a4 calculated by the SCORE and then uses a sync instruction to finish this operation.

FIG. 12 also illustrates a program code corresponding to single-core execution of the same task. It can be seen that the code is executed serially. Since the SCORE is a function subset of the VCORE and adopts a compatible instruction set, the task may be completed independently by the VCORE. In other words, the scalar processing part may be flexibly divided into two parts allocated to the SCORE and the VCORE respectively. A typical application is to allocate the whole scalar processing part to the SCORE. However, for a certain specific application, the scalar processing part and a processing boundary of the SCORE and the VCORE may be flexibly cut to maximize efficiency of the two cores.

Figure 13:
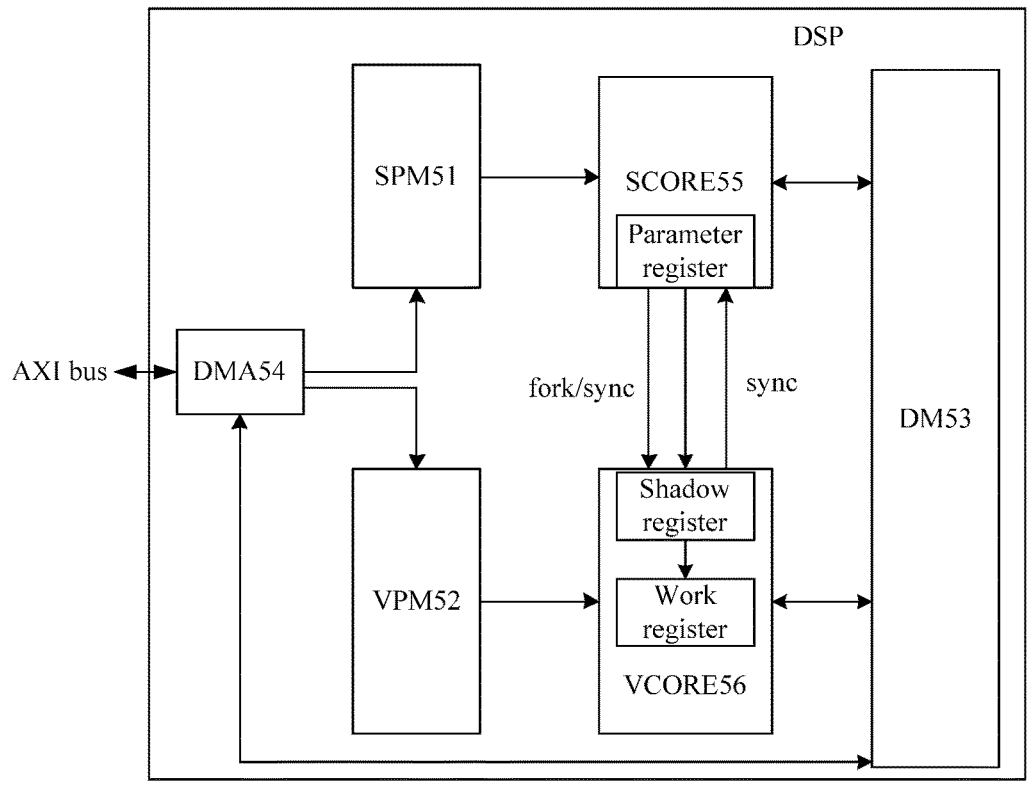
FIG. 13 is a structure block diagram of a processor according to another embodiment of the disclosure.

FIG. 13 is a structure block diagram of a processor according to another embodiment of the disclosure. As illustrated in FIG. 13, compared with the above-mentioned embodiment, the PBUF 57 is eliminated in the embodiment, but the SCORE 55 is required to output fork or sync instruction information to the VCORE 56 and the VCORE 56 is also required to output sync instruction information to the SCORE 55. The values written into the parameter register by the SCORE 55 are simultaneously written into the shadow register of the VCORE 56. Compared with the above-mentioned embodiment, the embodiment reduces a resource overhead, but may influence performance of the processor, which will be elaborated in combination with FIG. 14.

Figure 14:
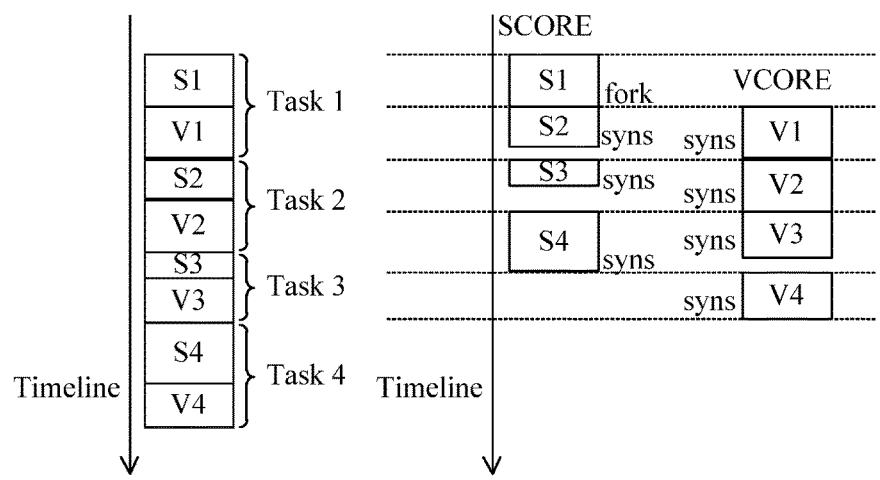
FIG. 14 is a schematic diagram of paralleling and synchronization of a processor according to another embodiment of the disclosure.

As illustrated in FIG. 14, since there is no PBUF caching the parameters, when the SCORE executes the fork or sync instruction and will execute parameter calculation for a next task, the SCORE may execute parameter calculation for the next task only when the VCORE is in the idle state or executing the sync instruction. The SCORE waits in order to prevent the shadow register values from being over-written by a writing operation of the SCORE when the shadow register values have yet not been copied into the work register. When the VCORE executes the sync instruction and will execute vector calculation for the next task, if the SCORE is in a waiting state or the SCORE executes the fork or sync instruction, the vector calculation for the next task is performed, otherwise the VCORE enters the idle state. The VCORE enters the idle state in order to wait for completion of corresponding parameter calculation by the SCORE. When the SCORE executes the fork or sync instruction and the VCORE is in the idle state, or the VCORE executes the sync instruction and the SCORE is in the waiting state, or the SCORE executes the fork or sync instruction and the VCORE executes the sync instruction, the shadow register values are copied into the work register at once.

From FIG. 14, it can be seen that, compared with the above-mentioned embodiment, the embodiment may bring a loss of the processor performance because there is no PBUF caching the parameters and thus the VCORE is caused to have the idle state. For achieving performance the same as or approximate to that achieved in the above-mentioned embodiment, it is necessary to perform more accurate scalar and vector division and task division during software programming, and balance the scalar and vector parts and balance tasks as much as possible, so that a higher requirement on software programming is made.

Figure 15:
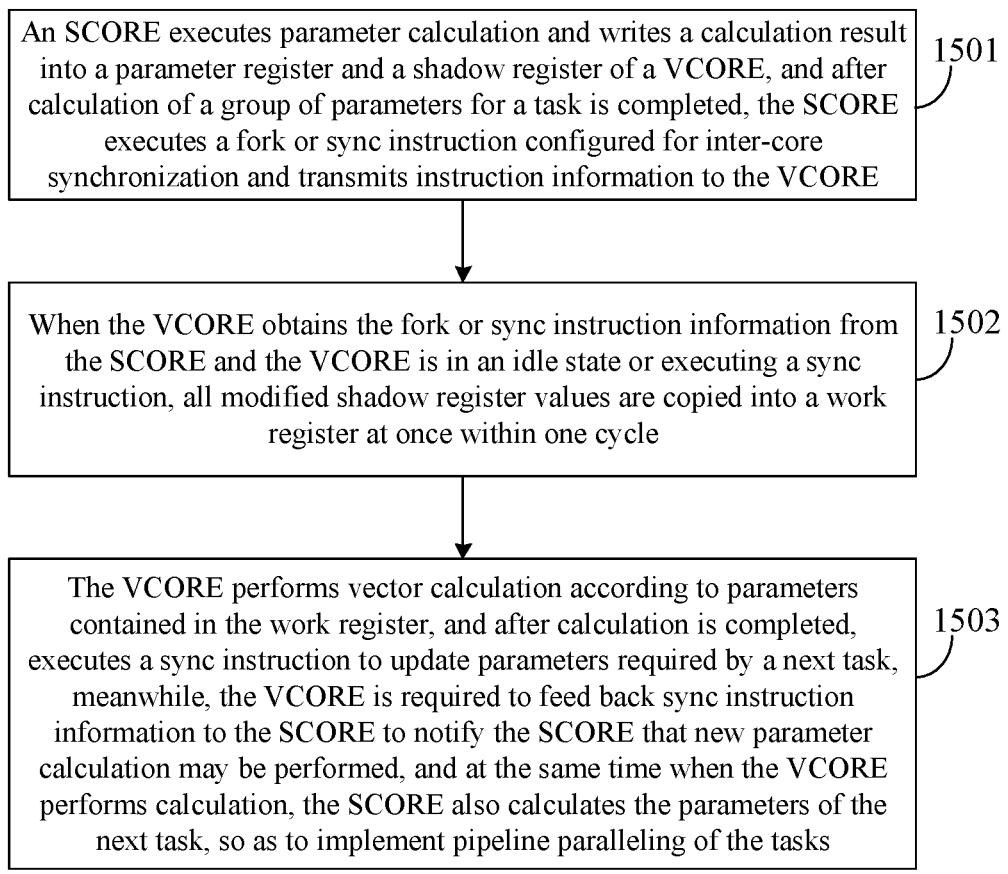
FIG. 15 is a flowchart of a task processing method for a processor according to another embodiment of the disclosure.

FIG. 15 is a flowchart of a task processing method for a processor according to another embodiment of the disclosure. Dual-core parallel calculation and interaction are implemented according to the following operations.

In 1501, an SCORE executes parameter calculation and writes a calculation result into a parameter register and a shadow register of a VCORE. After calculation of a group of parameters for a task is completed, the SCORE executes a fork or sync instruction configured for inter-core synchronization and transmits instruction information to the VCORE.

In 1502, when the VCORE obtains the fork or sync instruction information from the SCORE and the VCORE is in an idle state or executing a sync instruction, all modified shadow register values are copied into a work register at once within one cycle.

In 1503, the VCORE performs vector calculation according to parameters contained in the work register, and after the calculation is completed, executes a sync instruction to update parameters required by a next task. Meanwhile, the VCORE is required to feed back sync instruction information to the SCORE to notify the SCORE that new parameter calculation may be performed. At the same time when the VCORE performs calculation, the SCORE also calculates the parameters of the next task, so as to implement pipeline paralleling of the tasks.

Figure 16:
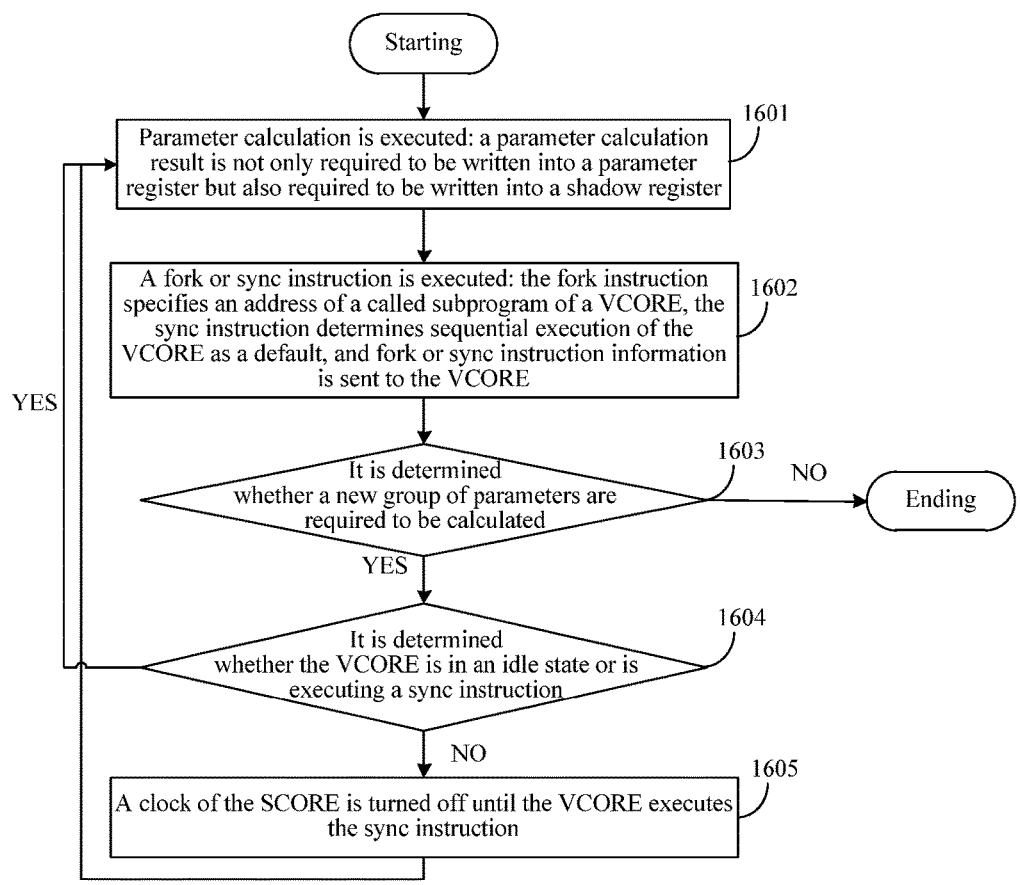
FIG. 16 is a flowchart of task processing of an SCORE according to another embodiment of the disclosure.

FIG. 16 is a flowchart of task processing of an SCORE according to another embodiment of the disclosure. A processing process of the SCORE is as follows.

In 1601, parameter calculation is executed: a parameter calculation result is not only required to be written into a parameter register but also required to be written into a shadow register.

In 1602, a fork or sync instruction is executed: the fork instruction specifies an address of a called subprogram of a VCORE, and the sync instruction determines sequential execution of the VCORE as a default. Fork or sync instruction information is sent to the VCORE.

In 1603, it is determined whether a new group of parameters are required to be calculated, if NO, the SCORE finishes work, and if YES, the operation in 1604 is executed.

In 1604, it is determined whether the VCORE is in an idle state or is executing a sync instruction. If the VCORE is in the idle state or is executing the sync instruction, the operation in 1601 for parameter calculation is re-executed, otherwise the operation in 1605 is executed.

In 1605, a clock of the SCORE is turned off until the VCORE executes the sync instruction.

Figure 17:
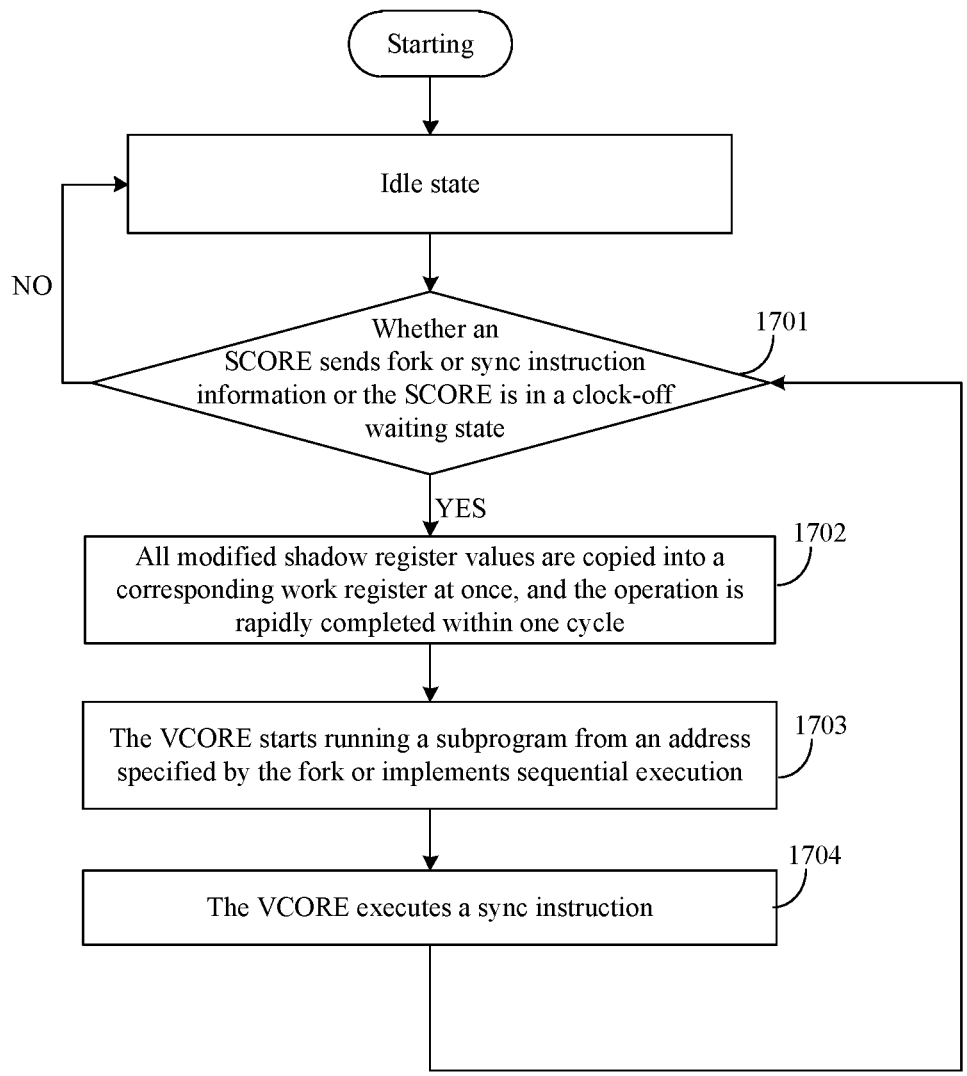
FIG. 17 is a flowchart of task processing of a VCORE according to another embodiment of the disclosure.

FIG. 17 is a flowchart of task processing of a VCORE according to another embodiment of the disclosure. A processing process of the VCORE is as follows.

In 1701, in an idle state, if an SCORE sends fork or sync instruction information or the SCORE is in a clock-off waiting state, a next operation is executed, otherwise the VCORE is kept in the idle state.

In 1702, all modified shadow register values are copied into a corresponding work register at once. The operation is rapidly completed within one cycle.

In 1703, the VCORE starts running a subprogram from an address specified by the fork or implements sequential execution.

In 1704, the VCORE executes a sync instruction, determines whether the SCORE sends the fork or sync instruction information or the SCORE is in the clock-off waiting state. If YES, the VCORE executes the operation of copying the shadow register values into the work register, and if NO, the VCORE enters the idle state. After entering the idle state, the VCORE keeps waiting for the fork or sync instruction information.

An embodiment of the disclosure further provides a storage medium, in which computer programs are stored, the computer program being configured to execute the task processing method for the processor in each embodiment mentioned above.

The technical solutions in the embodiments of the disclosure may be combined in any combination without conflicts.

In some embodiments provided by the disclosure, it should be understood that the disclosed method and intelligent equipment may be implemented in another manner. The equipment embodiment described above is only schematic, for example, division of the units is only logic function division, and other division manners may be adopted during practical implementation. For example, multiple units or components may be combined or integrated into another system, or some characteristics may be neglected or not executed. In addition, coupling, or direct coupling or communication connection between displayed or discussed components may be indirect coupling or communication connection, implemented through some interfaces, of the equipment or the units, and may be electrical and mechanical or in other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, functional units in each embodiment of the disclosure may be integrated into a second processing unit, each unit may also exist independently, and two or more than two units may also be integrated into a unit. The integrated unit may be implemented in a hardware form, and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

INDUSTRIAL APPLICABILITY

The processor of the disclosure uses the scalar calculation module and the vector calculation module to execute the scalar processing part and vector processing part of each task respectively, and utilizes the PBUF as a parameter buffer for outputs of the scalar processing and inputs of the vector processing, so that a scalar processing program and a vector processing program may be executed in parallel, and performance of the processor is remarkably improved. In addition, due to an all-at-once updating strategy from the shadow register to the work register, there is hardly any additional time overhead in task switching of the vector calculation module. The vector calculation module also has a scalar operation function, that is, the SCORE is a function subset of the VCORE, and the SCORE and the VCORE adopt a compatible instruction set, so that scalar and vector task division and maximal program optimization may be flexibly implemented.

The invention claimed is:

1. A task processing method for a processor, comprising:
    executing, by a scalar calculation module, parameter calculation for a present task, storing parameters obtained by calculation into a Parameter Buffer (PBUF), when the parameter calculation for the present task is completed, executing a first instruction or a second instruction configured for inter-core synchronization, and storing the first instruction or the second instruction into the PBUF;
    reading, by a vector calculation module, the parameters out from the PBUF, storing the read parameters into a shadow register, and when the first instruction or the second instruction is read out from the PBUF, storing all modified parameters in the shadow register into a work register within one cycle; and
    executing, by the vector calculation module, vector calculation for the present task according to the parameters in the work register.

2. The task processing method for the processor according to claim 1, wherein storing all the modified parameters in the shadow register into the work register within one cycle when the first instruction or the second instruction is read out from the PBUF comprises:
    when the first instruction or the second instruction is read out from the PBUF and the vector calculation module is in an idle state or executing a third instruction, storing all the modified parameters in the shadow register into the work register within one cycle.

3. The task processing method for the processor according to claim 1, further comprising:
    after vector calculation for the present task is completed, executing, by the vector calculation module, a third instruction configured for updating parameters of a next task.

4. The task processing method for the processor according to claim 1, wherein the first instruction executed by the scalar calculation module is configured to notify the vector calculation module that parameter calculation for the present task is completed; and
    the first instruction contains indication information indicating an address of a called subprogram of the vector calculation module.

5. The task processing method for the processor according to claim 1, wherein
    the second instruction executed by the scalar calculation module is configured to notify the vector calculation module that parameter calculation for the present task is completed; and
    the second instruction is configured to indicate the vector calculation module to execute programs according to a preset sequence.

6. The task processing method for the processor according to claim 1, further comprising:
    after the first instruction or the second instruction is stored into the PBUF, calculating, by the scalar calculation module, parameters of a next task.

7. A processor, comprising: a scalar calculation module, a vector calculation module and a Parameter Buffer (PBUF), wherein the vector calculation module comprises: a shadow register and a work register;
    the scalar calculation module is configured to execute parameter calculation for a present task, store parameters obtained by calculation into the PBUF, when parameter calculation for the present task is completed, execute a first instruction or a second instruction configured for inter-core synchronization and store the first instruction or the second instruction into the PBUF;
    the shadow register is configured to read the parameters out from the PBUF and store the read parameters;
    the work register is configured to store all modified parameters in the shadow register within one cycle when the first instruction or the second instruction is read out from the PBUF; and the vector calculation module is configured to execute vector calculation for the present task according to the parameters in the work register.

8. The processor according to claim 7, wherein the work register is further configured to, when the first instruction or the second instruction is read out from the PBUF and the vector calculation module is in an idle state or executing a third instruction, store all the modified parameters in the shadow register within one cycle.

9. The processor according to claim 7, wherein the vector calculation module is further configured to, after vector calculation for the present task is completed, execute a third instruction configured for updating parameters of a next task.

10. The processor according to claim 7, wherein the first instruction executed by the scalar calculation module is configured to notify the vector calculation module that parameter calculation for the present task is completed; and
  the first instruction contains indication information indicating an address of a called subprogram of the vector calculation module.

11. The processor according to claim 7, wherein the second instruction executed by the scalar calculation module is configured to notify the vector calculation module that parameter calculation for the present task is completed; and
  the second instruction is configured to indicate the vector calculation module to execute programs according to a preset sequence.

12. The processor according to claim 7, wherein the scalar calculation module is further configured to, after the first instruction or the second instruction is stored into the PBUF, calculate parameters of a next task.

13. A non-transitory computer-readable storage medium, the storage medium storing computer programs that, when executed by a processor, causes the processor to execute a task processing method for the processor, the task processing method for the processor comprising:
  executing parameter calculation for a present task, storing parameters obtained by calculation into a Parameter Buffer (PBUF), when the parameter calculation for the present task is completed, executing a first instruction or a second instruction configured for inter-core synchronization, and storing the first instruction or the second instruction into the PBUF;
  reading the parameters out from the PBUF, storing the read parameters into a shadow register, and when the first instruction or the second instruction is read out from the PBUF, storing all modified parameters in the shadow register into a work register within one cycle; and
  executing vector calculation for the present task according to the parameters in the work register.

14. The non-transitory computer-readable storage medium according to claim 13, wherein storing all the modified parameters in the shadow register into the work register within one cycle when the first instruction or the second instruction is read out from the PBUF comprises:
  when the first instruction or the second instruction is read out from the PBUF and a vector calculation module is in an idle state or executing a third instruction, storing all the modified parameters in the shadow register into the work register within one cycle.

15. The non-transitory computer-readable storage medium according to claim 13, further comprising:
  after vector calculation for the present task is completed, executing a third instruction configured for updating parameters of a next task.

16. The non-transitory computer-readable storage medium according to claim 13, wherein the first instruction is configured to notify a vector calculation module that parameter calculation for the present task is completed; and
  the first instruction contains indication information indicating an address of a called subprogram of the vector calculation module.

17. The non-transitory computer-readable storage medium according to claim 13, wherein the second instruction is configured to notify a vector calculation module that parameter calculation for the present task is completed; and
  the second instruction is configured to indicate the vector calculation module to execute programs according to a preset sequence.

18. The non-transitory computer-readable storage medium according to claim 13, the method further comprising:
  after the first instruction or the second instruction is stored into the PBUF, calculating parameters of a next task.

* * * * *